United States Patent
Gioia

(10) Patent No.: US 6,931,155 B1
(45) Date of Patent: Aug. 16, 2005

(54) SELECTIVE MESH REFINEMENT

(75) Inventor: Patrick Gioia, Rennes (FR)

(73) Assignee: Telediffusion De France, Paris (FR)

( * ) Notice: Subject to any disclaimer, the term of this patent is extended or adjusted under 35 U.S.C. 154(b) by 0 days.

(21) Appl. No.: 09/743,972

(22) PCT Filed: Aug. 3, 1999

(86) PCT No.: PCT/FR99/01924

§ 371 (c)(1),
(2), (4) Date: Jun. 1, 2001

(87) PCT Pub. No.: WO00/08604

PCT Pub. Date: Feb. 17, 2000

(30) Foreign Application Priority Data

Aug. 3, 1998  (FR) .................................. 98 10097

(51) Int. Cl.[7] .............................................. G06K 9/36
(52) U.S. Cl. ....................... 382/232; 382/240; 382/248
(58) Field of Search ............................... 382/232, 240, 382/248; 345/419, 582, 418, 420, 428; 348/564; 708/203

(56) References Cited

U.S. PATENT DOCUMENTS

| | | | | |
|---|---|---|---|---|
| 6,144,773 A | * | 11/2000 | Kolarov et al. | ............. 382/240 |
| 6,262,737 B1 | * | 7/2001 | Li et al. | ....................... 345/419 |
| 6,314,205 B1 | * | 11/2001 | Masuda et al. | ............. 382/232 |

FOREIGN PATENT DOCUMENTS

| | | | | |
|---|---|---|---|---|
| EP | 789 330 | 8/1997 | ........... G06T 17/20 |
| WO | WO 97/32281 | * | 2/1997 | ............ G06T 9/00 |

OTHER PUBLICATIONS

"Efficient Triangular Surface Approximations Using Wavelets and Quadtree Data Structures"; Gross, Markus; Staadt, Oliver; Gatti, Roger; IEEE, vol. 2, No. 2; Jun. 1996; XP000637707.

"A Comparison of Mesh Simplification Algorithms"; Cignoni, P.; Monani, C.; Scopigno, R.; Comput. & Graphics, vol. 22, No. 1, pp. 37-54; 1998.

"Including shape handles in recursive subdivsion surfaces"; Brunet, P.; Computer Aided Geometric Design 5 (1988) 41-50; XP-002085289.

"Multiresolution Analysis of Arbitrary Meshes"; Eck, M.; DeRose, T.; Duchamp, T.; Hoppe, H.; Lounsbery, M.; Stuetzle, W.; Computer Graphics Proceedings, Annual Conferences Series, 1995; XP-000546226.

* cited by examiner

*Primary Examiner*—Anh Hong Do
(74) *Attorney, Agent, or Firm*—Merchant & Gould P.C.

(57) ABSTRACT

The invention concerns a method for coding an original mesh representing a three-dimensional object, which consist in determining a simple meshing having a reduced number of defined faces each defined by vertices and edges, then coefficients in a wavelet base of a function whereof said source mesh is the image defined on said simple mesh, so as to supply successive refined meshes. The method is characterized in that each of the faces of said meshes is subdivided into a limited number of facets to form the higher level mesh, the subdivisions of said surface corresponding only to those required for observing an affinity condition of said function of said face. The invention also concerns the corresponding method for reconstructing the mesh.

8 Claims, 2 Drawing Sheets

SELECTIVE MESH REFINEMENT

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

FIELD OF THE INVENTION

The field of the invention is that of the encoding of images or image elements. More specifically, the invention relates to the adaptive representation and encoding of scenes (or objects of a scene) in three dimensions (3D) represented by meshes.

The invention can be applied in all fields where it is desirable to reduce the number of information elements needed for the efficient depiction, storage and/or transmission of a digital image. For example, the invention may be used to transmit images through the Internet. In this context, it enables the animation of 3D scenes with real-time display although the bit rate is neither constant nor ensured. In this case, the invention may be a primitive of a data transmission language such as VRML.

Other applications that may be envisaged include the storage of animated data on CD-ROM (or an equivalent data carrier), multiple-user applications, digital television, etc.

BRIEF SUMMARY OF THE INVENTION

The invention proposes an improvement to so-called "wavelet" methods used to represent a mesh as a sequence of details added to a basic mesh. The general theory of this technique is described especially in the article by M. Lounsberry, T. DeRose and J. Warren, "Multiresolution analysis for surfaces or arbitrary topological type" (ACM Transaction on Graphics, Vol. 16, No. 1, pp. 34–73).

According to this technique, a mesh is therefore represented by a sequence of coefficients that correspond to the coordinates in a base of wavelets of a parametrization of said mesh by a simple polyhedron. The corresponding mathematical principles are recalled in the appendix (this appendix forms part of the present description).

In practice, during the reconstruction, the basic mesh $M_0$ is shown in tree form: each of its faces is the root of a tree for which the offspring of each node are the four faces obtained after canonical subdivision. The wavelet coefficients are indexed by their barycentric coordinates on one face of $M_0$.

A subdivision technique has been proposed by A. Certain, Jovan Popovic, T. DeRose, T. Duchamp, D. Salesin and W. Stuetzle in the article "Interactive Multiresolution Surface Viewing" (Computer Graphics Proceedings 1996).

This technique consists in making subdivisions by observing a sufficient condition on the vertices: a vertex is said to be full if it is in the middle of a ridge shared by two faces that are subdivided into four as shown in FIG. 1.

The principle lies in starting from the vertex indexing the wavelet coefficient considered and, by subdivision, making its neighbors and then the neighbors of its neighbors complete, recursively until all the vertices are considered to be complete. This rule is derived from the observation that this algorithm is sufficient to provide for a subdivision adapted to the modifications made by the wavelet coefficient considered.

However, this technique has a major drawback: it induces the creation of unnecessary facets, leading to an unnecessary increase in the number of data elements necessary for the description of the mesh. More specifically, unnecessary facets are created by subdivisions that give the completeness of the vertices referred to further above.

In other words, there is a creation, in zones relatively distant from the support of the observed wavelet, of coplanar facets. This unnecessarily lowers the efficiency of the display of the object.

It is indeed known that the number of data elements (and therefore the number of facets) has major consequences especially when the object concerned is animated, the power of the terminal is limited and/or the transmission bit rate is variable and/or limited.

It is an aim of the invention especially to overcome these drawbacks of the prior art.

More specifically, it is an aim of the invention to provide a method for the encoding of a mesh representing a 3D object that produces a number of facets that is limited, as compared with the prior art, for an identical or similar quality of restitution.

Another aim of the invention is to provide an encoding method of this kind whose complexity (especially in terms of numbers of operations performed and memory capacity needed) is smaller, or at least of the same magnitude, as that of the known techniques.

It is also an aim of the invention to provide an encoding method of this kind, that can be used to have several levels of quality of restitution of the object, as a function of various criteria (processing capacity of the terminal, capacity of the available storage means, transmission bit rate, the user's needs, etc.).

Yet another aim of the invention is to provide an encoding method of this kind that can be used for a progressive reconstruction of the object.

It is also an aim of the invention, naturally, to provide a method of reconstruction of an object encoded according to this encoding method.

These aims and others that shall appear hereinafter are achieved according to the invention by means of a method for the encoding of a source mesh (M) representing a 3D object in which there is determined a simple mesh ($M_0$) with a limited number of faces, each defined by vertices and ridges, and then coefficients in a base of wavelets of a function (f), of which said source mesh is the image defined on said simple mesh ($M_0$), so as to give a subdivision of said source mesh (M) into successive refined meshes (or submeshes) ($M_j$), according to a predetermined criterion. According to the invention, each of the faces of said meshes ($M_j$) is subdivided into a limited number of facets to form the higher-level mesh ($M_{j+1}$), the subdivisions of said face corresponding solely to those needed to comply with a condition of affinity of said function (f) on said face.

Indeed, the inventor has observed that the taking into account of a wavelet coefficient must be accompanied by a local subdivision in the vicinity of the vertex indexing the wavelet in question, so that this wavelet can be refined by pieces on said facet. Since, the wavelets are the sums of functions $\phi_1^j$, it is sufficient to be able to localize the support of such a function and locally subdivide the facets that contain them until this function is refined on each resultant facet.

It will be noted hereinafter that the terms "face" and "facet" are used without distinction. In general, a "facet" is a subdivision of a "face".

Advantageously, said source mesh (M) is subdivided up into a set of trees, each of said trees representing a face of said simple mesh ($M_0$) and comprising nodes each representing a face of a mesh ($M_j$), said function (f) being refined on each of said faces. Then, each of said trees is the smallest such that, when a given face is subdivided into four facets, the corresponding node comprises four offspring representing said four facets.

Advantageously, the method of the invention enables access to several levels of encoding quality, corresponding to each of said successive meshes.

This is easy because of the very structure of the subdivision as shall be seen hereinafter.

Preferably, said successive meshes are obtained by the implementation of a recursive algorithm. The method is thus particularly simple to implement.

According to an advantageous embodiment, said recursive algorithm comprises the following steps:
(a) the reception of a wavelet coefficient indexed by a vertex (s) of barycentric coordinates ($\alpha$, $\beta$, $\gamma$) on a face $F_0$;
(b) for each neighboring face $F_j$ of $F_0$ containing said vertices (s):
F=$F_i$ is supposed;
from the barycentric coordinates ($\alpha$, $\beta$, $\gamma$), the coordinates of said vertex (s) in the refined base formed by the vertices of the face F, also referenced ($\alpha$, $\beta$, $\gamma$), are deduced;
if the coordinates $\alpha$, $\beta$ or $\gamma$ are positive or zero and if two of them are strictly positive:
the face F is subdivided;
the processing of the step (b) is resumed for the four offspring of the face F successively.

The invention also relates to a method of reconstruction of a source mesh (M) representing a 3D object encoded according to the encoding method described here above.

Advantageously, a method of reconstruction of this kind provides for the progressive reconstruction of said object using the simple mesh ($M_0$) and then by means of successive meshes ($M_i$).

Preferably, this method of reconstruction enables access to several levels of quality of encoding, corresponding to each of said successive meshes.

The invention can be applied advantageously to several fields and can be applied especially to at least one of the following fields:
the display of meshed objects in a 3D screen;
the progressive display of meshed objects in three dimensions on a screen, said wavelet coefficients being taken into account as and when they arrive;
the display of meshed objects in three dimensions on a screen with at least two levels of detail, one level of detail corresponding to one of said successive meshes ($M_i$);
the display of different parts of a meshed object with at least two different levels of detail;
the compression of a mesh of a meshed object.

BRIEF DESCRIPTION OF THE SEVERAL VIEWS OF THE DRAWINGS

Other features and advantages of the invention shall appear more clearly from the following description of a preferred embodiment of the invention given by way of a simple non-restrictive illustration and from the appended drawings, of which.

Figure 1:
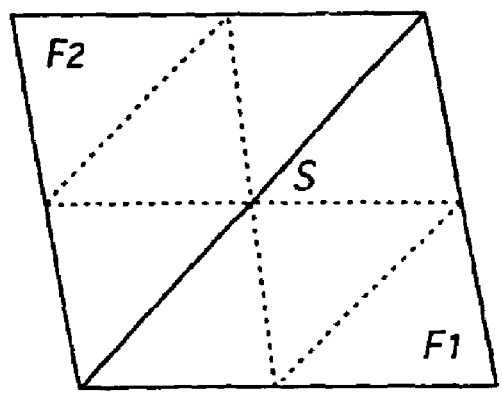
FIG. 1, already commented upon in the introduction, illustrates a complete vertex according to the technique used by Certain et al.

The method of encoding a mesh according to the invention is therefore aimed especially at carrying out the minimum number of subdivisions needed while at the same time retaining the same algorithmic complexity as in the prior art.

DETAILED DESCRIPTION OF THE INVENTION

Throughout the rest of this document, it will be said that a point s has barycentric coordinates ($\alpha$, $\beta$, $\gamma$), on a face $F_0$ if its barycentric coordinates in the refined base formed by the vertices of $F_0$ are ($\alpha$, $\beta$, $\gamma$). Also, $M_0$ will not be specified when there is no possible confusion.

The basic algorithm of the invention, independently of any implementation, is the following:
1. Receive a wavelet coefficient indexed by a vertex s having barycentric coordinates ($\alpha$, $\beta$, $\gamma$), on a face $F_0$.
2. For each neighboring face $F_i$ of $F_0$ containing s:
   (a) F=$F_i$.
   (b) Deduce ($\alpha$, $\beta$, $\gamma$) the coordinates of s in the refined base formed by the vertices of F also referenced ($\alpha$, $\beta$, $\gamma$).
   (c) If $\alpha$ or $\beta$ or $\gamma$ are all positive or null or if two of them are strictly positive:
      i. subdivide F
      ii. start again at (b) with, for F, its four offspring successively.

When the algorithm stops, there is a minimum subdivision of $M_0$ obtained with a complexity in linear time as compared with the degree of subdivision. The transmission bit rate and/or the storage capacity needed are therefore optimized.

It must be noted that the invention is used to determine not only the minimum tree corresponding to f, but also each of its approximations, in truncating the sum (see appendix):

$$f = \sum_i c_i^0 \phi_i^0 + \sum_{j=0} \sum_i d_i^j \psi_i^j$$

Since the sum is precisely obtained progressively, by adding terms one after the other, the operation passes from a tree representing an approximation $f_i$ to a tree representing:

$f_i + c_{i'}^{j'} \psi_{i'}^{j'}$ (where $c_{i'}^{j'}$ is a wavelet coefficient transmitted in performing only the facet subdivisions strictly necessary for the condition of affinity on each face.

It is thus possible to progressively reconstruct the object and/or to choose a level of quality (corresponding to the index j).

The progressively reconstructed mesh can be represented as n 4-trees describing the successive divisions of the n faces of the mesh $M_0$ transmitted prior to the wavelet coefficients. Each wavelet coefficient received is accompanied by three integers A, B and C proportional to the barycentric coordinates of the vertex s indexing the wavelet associated with the coefficient, as well as an integer designating the face $F_0$ indicating a facet containing s.

If s belongs to $M_j+1$, A, B and C are deduced from the barycentric coordinates $\alpha, \beta$ and $\gamma$ of s in the refined base formed by the vertices of $F_0$ by:

$(A, B, C) = 2^{j+1}(\alpha, \beta, \gamma)$

The wavelet centered at s has the form:

$$\psi_i^j = \phi_i^{j+1} + \sum_{k \in D} \alpha_k \phi_k^j$$

where D is the neighborhood of s on the mesh $M_j$. The technique explained in the previous part must therefore be applied to each of the functions that appear in the sum, with their respective barycentric coordinates.

Figure 2:
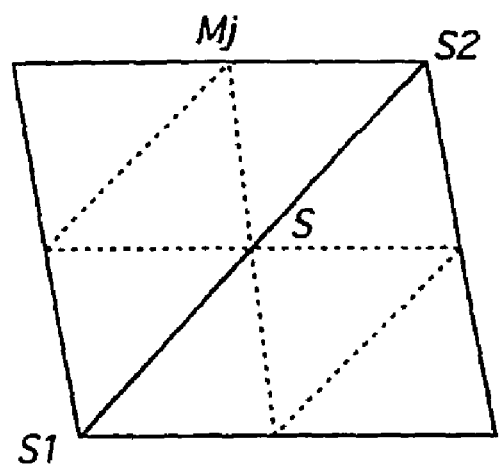
FIG. 2 illustrates the direct neighborhood of a vertex s according to the invention.
Figure 2:
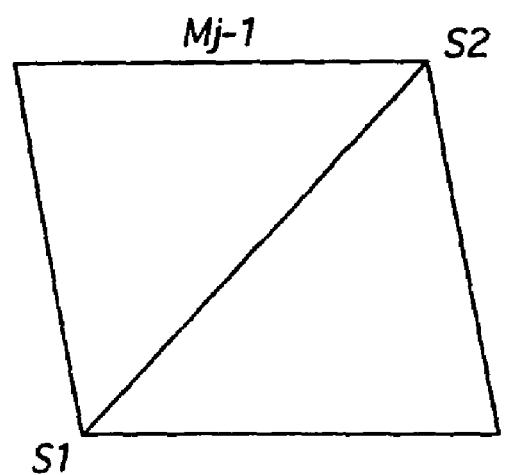

These barycentric coordinates are expressed in the same refined base as those of s and deduced from these coordinates: the neighborhood D is, for a value of k that is fixed, the set of vertices of $M_j$ at a distance of at most k ridges from one of the ends $s_1$, and $s_2$ of the ridge of $M_j$ containing s, as shown in FIG. 2. The barycentric coordinates of these two vertices are characterized by the following criterion:

The triplet $(\alpha', \beta', \gamma')$ represents the coordinates of one of these two points if and only if the triplet of integers $(A', B', C') = 2^j(\alpha', \beta', \gamma')$ verifies:

$(2A'-A, 2B'-B, 2C'-C) \in \epsilon$ where $\epsilon$ designates the set:
{(1, −1, 0), (−1, 1, 0), (1, 0, 1), (−1, 0, 1), (0, 1, −1), (0, −1, 1)}

With these two direct neighbors of s, $s_1$ and $S_2$ being determined, the others are determined by applying the following criterion k times:

let u and v be two vertices with barycentric coordinates $(\alpha', \beta', \gamma')$ and $(\alpha'', \beta'', \gamma'')$ respectively on a face F. Then u and v are connected by a ridge on $M_j$ if and only if:

$2^j(\alpha'-\alpha'', \beta'-\beta'', \gamma'-\gamma'') \in \epsilon$ giving explicitly the list of the vertices in the neighborhood D.

Each of these vertices, provided with its barycentric coordinates $(\alpha, \in \beta, \gamma)$ may thus give rise to the subdivisions needed for the modifications made by the corresponding function $\phi_i^j$ according to a variant of the algorithm described further above. The operation starts from the pair $(A, B, C) = 2^j(\alpha, \beta, \gamma)$ where j is the smallest integer such that A, B and C are integers and, at each subdivision, the basic change matrix of this triplet is applied in such a way that tests of positivity are made only on the integers.

The four matrices of passage of the refined base represented by the three vertices of a face with refined bases represented by the three vertices of each of the offspring are explicitly:

$$\begin{pmatrix} 1 & -1 & -1 \\ 0 & 2 & 0 \\ 0 & 1 & 2 \end{pmatrix}, \begin{pmatrix} 2 & 0 & 0 \\ -1 & 1 & -1 \\ 0 & 0 & 2 \end{pmatrix}, \begin{pmatrix} 2 & 0 & 0 \\ 0 & 2 & 0 \\ -1 & -1 & 1 \end{pmatrix} \text{et} \begin{pmatrix} 1 & 1 & -1 \\ -1 & 1 & 1 \\ 1 & -1 & 1 \end{pmatrix}$$

Figure 3:
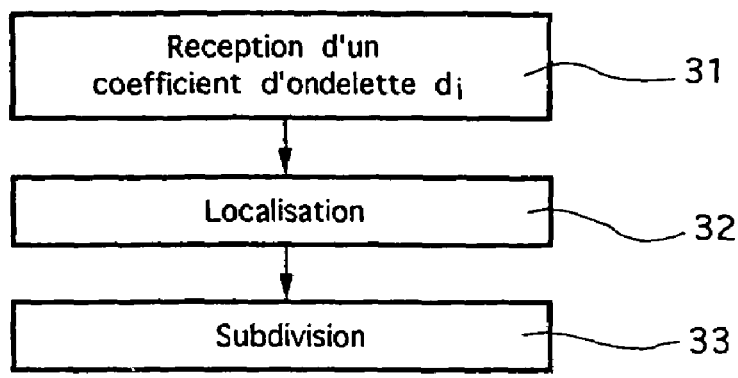
FIG. 3 is a simplified general block diagram of the encoding method according to the invention.

The method described here above is illustrated in a very simplified way in FIG. 3. For each wavelet coefficient $D_i^j$ received (31), a localization step 32 is performed in which the elements to be processed are brought into the appropriate refined base and then a step of subdivision (33) of each face considered is performed.

Figure 4:
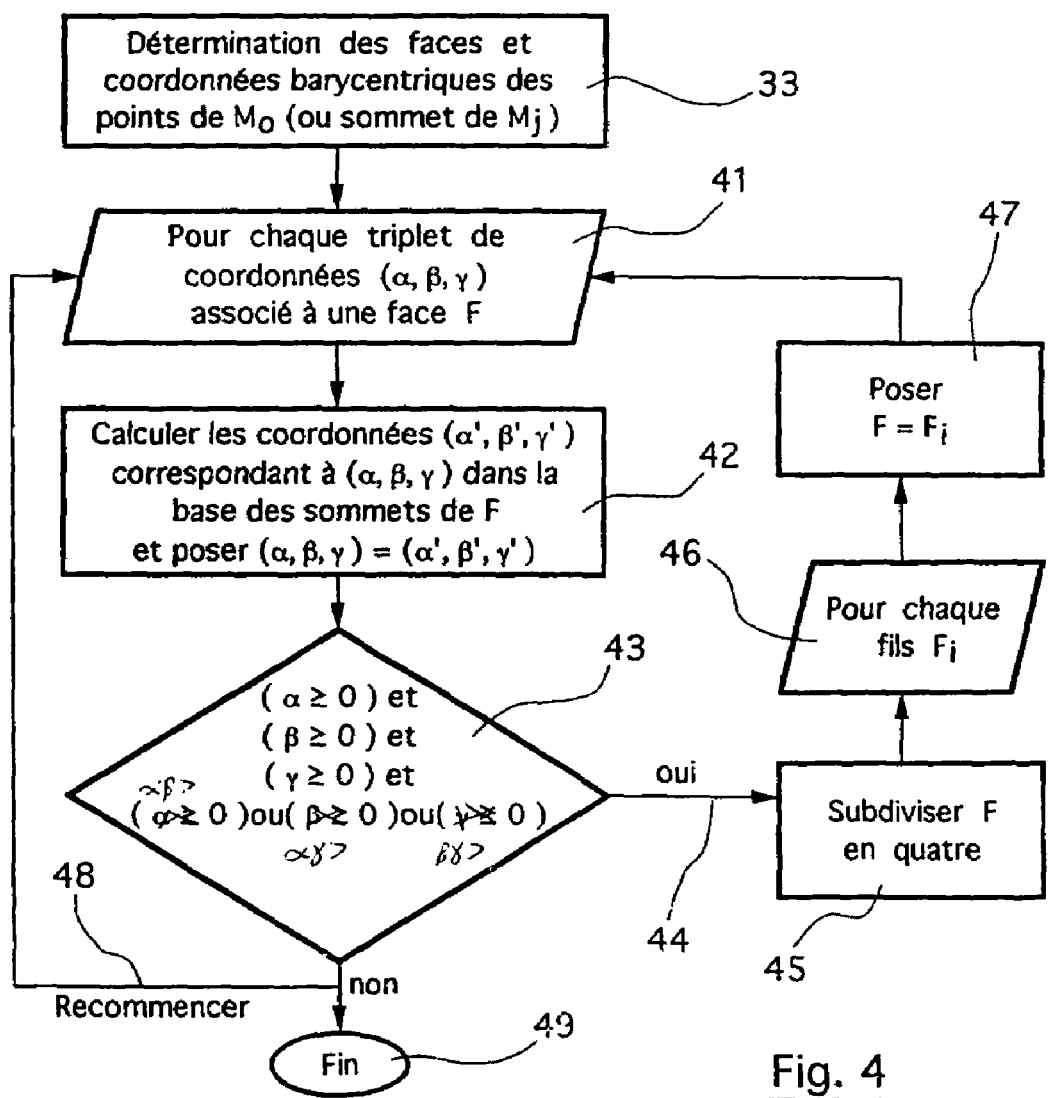
FIG. 4 is a more detailed block diagram, resuming and detailing the steps of localization and subdivision of FIG. 3.

A more detailed exemplary implementation of these two steps 32 and 33 is shown in FIG. 4.

In the localization 32, with $\psi_i^j$ being written as a weighted sum of scale functions at the level j+1, the faces and the barycentric coordinates of the points of $M_0$(or vertices of $M_j$) indexing these scale functions are determined.

Then, for each triplet with coordinates $(\alpha, \beta, \gamma)$ associated with a face F (41), the coordinates $(\alpha', \beta', \gamma')$ corresponding to $(\alpha, \beta, \gamma)$ in the base of the vertices of F are computed (42) and $(\alpha, \beta, \gamma) = (\alpha', \beta', \gamma')$ is supposed.

Then the test 43 is performed:

$(\alpha \geq 0)$ and $(\beta \geq 0)$ and $(\gamma \geq 0)$ and $((\alpha\beta > 0)$ or $(\alpha\gamma > 0)$ or $(\beta\gamma > 0))$ If the result is positive (44), a recursivity loop is made in which the face F is subdivided (45) into four offspring $F_i$ and then for each offspring $F_i$ (46) $F = F_i$ (47) is supposed and the operation is resumed at the step 41 recursively.

If the result of the test 43 is negative, the processing is resumed (48) for a new face F (41). When all the faces F have been processed, the subdivision is ended (49).

What is claimed is:

1. Method for the encoding of a source mesh (M) representing a 3D object in which is determined a simple mesh ($M_0$) with a limited number of faces, each defined by vertices, ridges, and coefficients in a base of wavelets of a function (f) of which said source mesh is the image defined on said simple mesh ($M_0$), so as to give a subdivision of said source mesh (M) into successive refined meshes (or submeshes) ($M_j$), according to a predetermined criterion, which comprises:

each of the faces of said meshes ($M_j$) is subdivided into a limited number of facets to form the higher-level mesh ($M_{j+1}$), and
   the subdivisions of said face corresponding solely to those needed to comply with a condition of affinity of said function (f) on said face.

2. Encoding method according to claim 1, characterized in that said source mesh (M) is subdivided up into a set of trees, each of said trees representing a face of said simple mesh ($M_0$) and comprising nodes each representing a face of a mesh ($M_j$), said function (f) being refined on each of said faces and each of said trees being the smallest such that, when a given face is subdivided into four facets, the corresponding node comprises four offspring representing said four facets.

3. Encoding method according to claim 1, characterized in that it enables access to several levels of encoding quality, corresponding to each of said successive meshes.

4. Encoding method according to claim 1, characterized in that said successive meshes are obtained by the implementation of a recursive algorithm.

5. Encoding method according to claim 1, characterized in that said recursive algorithm comprises the following steps:

(a) the reception (31) of a wavelet coefficient indexed by a vertex (s) of barycentric coordinates ($\alpha,\beta,\gamma$) on a face $F_0$;

(b) for each neighboring face $F_j$ of $F_0$ containing said vertices (s):

$F=F_i$ is supposed;

from the barycentric coordinates ($\alpha,\beta,\gamma$), the coordinates of said vertex (s) in the refined base (42) formed by the vertices of the face F, also referenced ($\alpha,\beta,\gamma$) are deduced;

if the coordinates $\alpha$, $\beta$, or $\gamma$ are positive or zero and if two of them are strictly positive (43):

the face F (45) is subdived;

the processing of the step (b) is resumed for the four offspring of the face F successively.

6. Method of reconstruction of a source mesh (M) representing a 3D object encoded according to the encoding method of claim 1, characterized in that said object is reconstructed progressively, using the simple mesh ($M_0$), and then by means of successive meshes ($M_i$).

7. Method of reconstruction according to claim 6, characterized in that it enables access to several levels of quality of encoding, corresponding to each of said successive meshes.

8. Application of the encoding method according to claim 1 to at least one of the following fields:

the display of meshed objects in a 3D screen;

the progressive display of meshed objects in three dimensions on a screen, said wavelet coefficients being taken into account as and when they arrive;

the display of meshed objects in three dimensions on a screen with at least two levels of detail, one level of detail corresponding to one of said successive meshes ($M_i$);

the display of different parts of a meshed object with at least two different levels of detail;

the compression of a mesh of a meshed object.

* * * * *